US012479220B2

(12) United States Patent
Saito et al.

(10) Patent No.: US 12,479,220 B2
(45) Date of Patent: Nov. 25, 2025

(54) RECORDING DEVICE

(71) Applicant: SEIKO EPSON CORPORATION, Tokyo (JP)

(72) Inventors: Yusuke Saito, Yamagata-mura (JP); Kenichiro Kaneko, Okaya (JP); Masaki Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 242 days.

(21) Appl. No.: 18/477,510

(22) Filed: Sep. 28, 2023

(65) Prior Publication Data

US 2024/0109347 A1 Apr. 4, 2024

(30) Foreign Application Priority Data

Sep. 30, 2022 (JP) ................................ 2022-157667

(51) Int. Cl.

*B41J 2/175* (2006.01)
*B41J 11/06* (2006.01)
*B41J 25/00* (2006.01)
*B41J 29/02* (2006.01)

(52) U.S. Cl.

CPC ........... *B41J 25/001* (2013.01); *B41J 2/1752* (2013.01); *B41J 11/06* (2013.01); *B41J 29/02* (2013.01)

(58) Field of Classification Search

CPC . B41J 2/175; B41J 2/1752; B41J 11/06; B41J 19/005; B41J 19/207; B41J 25/001; B41J 29/13

See application file for complete search history.

(56) References Cited

U.S. PATENT DOCUMENTS 5,259,418 A * 11/1993 Hamrick ................ H02G 3/283 138/131
2011/0090270 A1* 4/2011 Harada .................. B41J 2/2107 347/9
2011/0115856 A1* 5/2011 Harada .................... B41J 2/185 347/85
2012/0050416 A1* 3/2012 Ishizawa .................. B41J 2/175 347/85
2013/0286063 A1* 10/2013 Komatsu .................. B41J 29/38 347/6
2014/0063135 A1 3/2014 Nakashima

FOREIGN PATENT DOCUMENTS

JP 2014-046614 A 3/2014

* cited by examiner

*Primary Examiner* — Anh T Vo

(74) *Attorney, Agent, or Firm* — WORKMAN NYDEGGER

(57) ABSTRACT

The recording device includes an elongated member 79 and a housing section 60. The housing section 60 houses the elongated member 79, and has a fixed end 61, a moving end, and an elongated variable section. A curved portion, which is a portion where the variable section is folded back on the way, moves following the movement of the carriage. In the height direction HD of the housing section 60, film member 76 having flexibility is disposed between the elongated member 79 and the housing section 60. A coefficient of friction between the film member 76 and the elongated member 79 is smaller than a coefficient of friction between the housing section 60 and the elongated member 79.

6 Claims, 11 Drawing Sheets

RECORDING DEVICE

The present application is based on, and claims priority from JP Application Serial Number 2022-157667, filed Sep. 30, 2022, the disclosure of which is hereby incorporated by reference herein in its entirety.

BACKGROUND

1. Technical Field

The present disclosure relates to a recording device that performs recording on a medium such as paper by moving a recording head with respect to the medium.

2. Related Art

For example, JP-A-2014-46614 discloses a recording device of a serial recording system in which a recording head moves. This type of recording device includes an ink tank storing a plurality of types of ink, a recording head ejecting ink, and an ink supply path section having a CABLEVEYOR® (an example of a housing section) housing a plurality of ink pipes (an example of an elongated member) such as tubes that supply ink from the ink tank to the recording head. The CABLEVEYOR® is configured to be deformable such as curved by connecting a plurality of link members in a row. The housing section is provided with a fixed end, one end of which is fixed to the apparatus side, a moving end, that is fixed to a carriage mounts a recording head, and a variable section, that connects the fixed end and the moving end and has a curved portion that bends back in the middle.

However, in the recording device described in JP-A-2014-46614, the curved portion of the housing section is sequentially changed following the movement of the recording head. Since the displacement amount is larger on the outer circumferential side than on the inner circumferential side in the curved portion, the elongated member and the housing section are gradually displaced in the longitudinal direction by the difference in displacement amount between the inner circumferential side and the outer circumferential side. Due to this displacement, the elongated member such as a tube slides on the inner surface of the housing section. There is a problem that the elongated member is deteriorated by abrasion when the sliding is repeated over a long period of use.

In the recording device described in the above-mentioned JP-A-2014-46614, no consideration was given to the abrasion of the elongated member. Therefore, there is a demand for a recording device that can suppress the abrasion of the elongated member. The elongated member is not limited to a tube, and a power line, a signal line, a cable, a hose, or the like may be housed in the housing section.

SUMMARY

A recording device to solve the above-described includes a carriage having a recording head configured to record on medium and movable in a main scanning direction, an elongated member having one end connected to the recording head or the carriage, an elongated housing section that houses the elongated member and has a fixed end that is fixed to the apparatus side, a moving end that is fixed to the carriage, and an elongated variable section that is a variable section extending between the fixed end and the moving end, and that in which a curved portion, which is a portion where the variable section extending in parallel to the main scanning direction folds back at an intermediate section thereof, moves following movement of the carriage, and a flexible film member disposed between the elongated member and the housing section in a height direction intersecting with a longitudinal direction of the housing section, wherein a coefficient of friction between the film member and the elongated member is smaller than a coefficient of friction between the housing section and the elongated member.

DESCRIPTION OF EMBODIMENTS

Hereinafter, the recording device will be described with reference to the drawings. The recording device is, for example, a large format printer that performs printing on an elongated medium having a large size.

Figure 1:
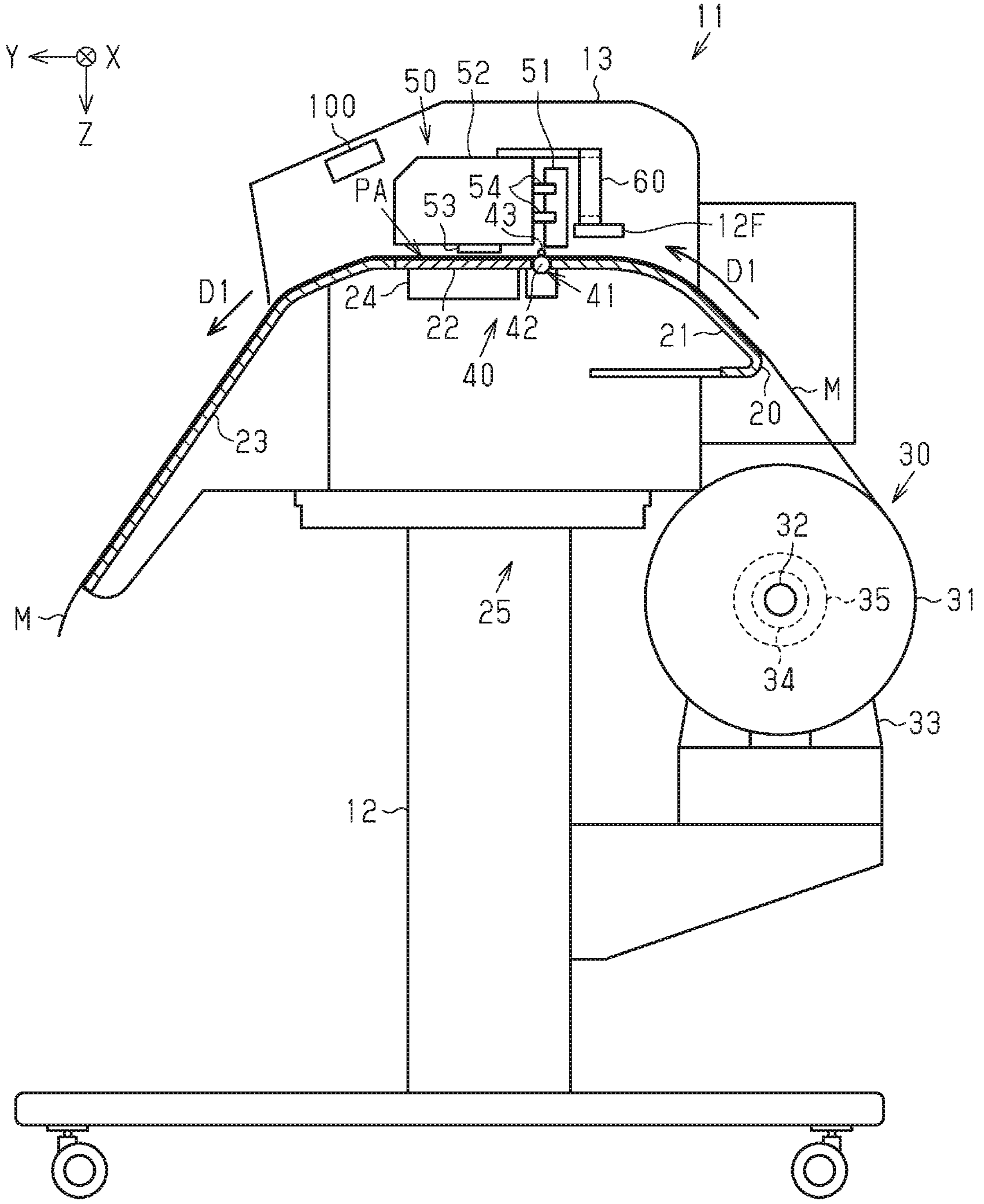
FIG. 1 is a side view showing a recording device according to an embodiment.

As shown in FIG. 1, a recording device 11 includes a support base 12, a chassis 13 fixed on the support base 12, a support portion 20 for supporting a medium M, a transport device 25 for transporting the medium M in a transporting direction D1 indicated by arrows in FIG. 1, and a recording unit 50 for recording on the medium M.

In the following description, a direction orthogonal to the transporting direction D1 of the medium M (a direction orthogonal to the paper surface in FIG. 1) is referred to as a main scanning direction X, and a direction in which the medium M is transported at a position where the recording unit 50 performs printing is referred to as a transporting direction Y. In the embodiment, the main scanning direction X and the transporting direction Y are directions that intersect (preferably, orthogonal to) each other, and both intersect (preferably, orthogonal to) the vertical direction Z (gravity direction). The transporting direction Y in which the medium M is transported with respect to the main scanning direction X is the sub-scanning direction. Note that the transporting direction D1 of the medium M changes according to the position on the transport path as indicated by a solid arrow in FIG. 1.

As illustrated in FIG. 1, the support portion 20 includes a first support portion 21, a second support portion 22, and a third support portion 23 which form a transport path of the medium M, and an attracting mechanism 24 which is disposed on the lower side of the second support portion 22. The first support portion 21 has an inclined surface which is inclined such that the downstream side is higher than the upstream side in the transporting direction Y. The second support portion 22 is provided at a position facing the recording unit 50, and supports the medium M on which printing is performed. The third support portion 23 has an inclined surface inclined so that the downstream side is lower than the upstream side in the transporting direction Y, and guides the medium M on which printing has been performed by the recording unit 50. The second support portion 22 has a plurality of suction holes (not shown) on a support surface for supporting the medium M, and suppresses the floating of the medium M on which printing is performed by attracting the medium M through the suction holes by the driving of the attracting mechanism 24.

Figure 2:
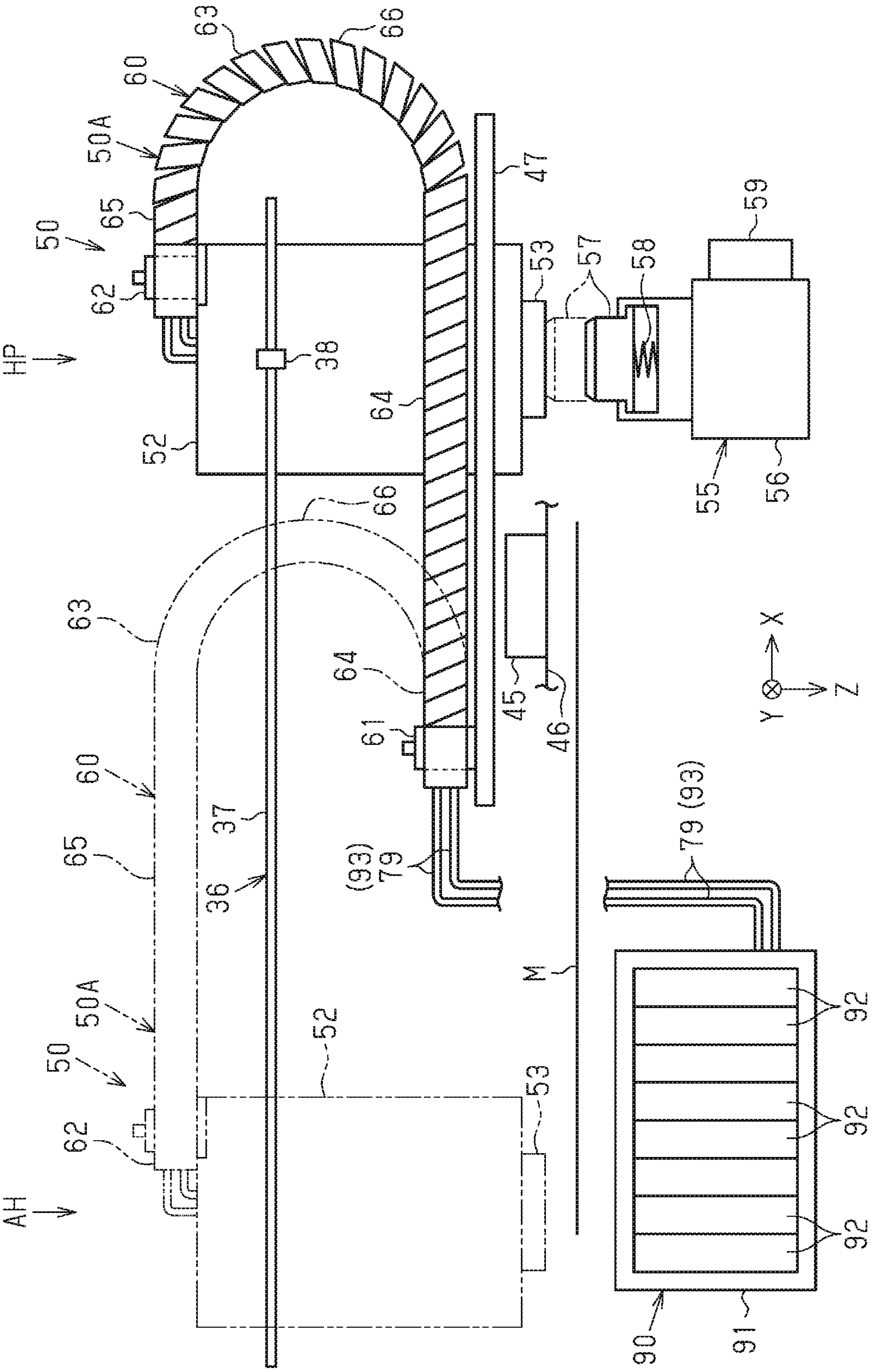
FIG. 2 is a schematic front view showing the recording unit.

Next, the structure of the transport device 25 will be described in detail. As illustrated in FIGS. 1 and 2, the transport device 25 includes a feeding section 30 which feeds the medium M, and a transport section 40 which transports the medium M fed from the feeding section 30 along the transporting direction Y. The feeding section 30 includes a holding section 33 having a roll body support portion 32 that rotatably supports a roll body 31 in which the medium M is wound in a roll shape, and a feed motor 34 that outputs power for rotating the roll body 31 forward and backward. The feeding section 30 includes a rotation detector 35 is configured to detect the rotation of the roll body support portion 32.

As shown in FIG. 1, the transport section 40 includes a roller pair 41 that sandwich and transport the medium M in the transporting direction Y, and a transport motor (not shown) that is a drive source that outputs power for transporting the medium M to the roller pair 41. The roller pair 41 includes a drive roller 42 and a driven roller 43, so as to face each other. When the drive roller 42 is rotated by the power of the transport motor, the medium M is transported along the upper surface of the support portion 20 in a state of being nipped by the roller pair 41.

As shown in FIG. 1, the recording unit 50 includes a carriage 52 movable in the main scanning direction X, and a recording head 53 provided on the carriage 52 for recording on a medium M. The recording head 53 performs recording on the medium M. The recording head 53 performs recording (printing) on the medium M in a printing area PA located downstream of the roller pair 41 in the transporting direction Y. The recording unit 50 employs a serial recording method. The carriage 52 is configured to be able to reciprocate in the main scanning direction X along a guide member 51 via an engaging section 54 by being driven by a carriage motor (not shown). The recording head 53 performs recording on the medium M supported by the support portion 20 in a process in which the carriage 52 moves in the main scanning direction X. In the serial recording method, a transport operation, transporting the medium M to the next recording position, and a recording operation, performing recording for one scanning by the recording head 53, are alternately performed, and thus a character or an image is recorded on the medium M. In a case where the recording head 53 is a liquid ejecting type (for example, an inkjet type) that ejects liquid such as ink, the recording head 53 performs recording by ejecting ink toward the medium M. The recording device 11 includes a control section 100 that controls the transport device 25 and the recording unit 50 illustrated in FIG. 1.

Configuration of Recording Unit 50

Next, a detailed configuration of the recording unit 50 will be described with reference to FIG. 2.

As shown in FIG. 2, the recording device 11 includes a liquid supply section 90. The liquid supply section 90 includes a holder 91. One or a plurality of liquid containers 92 are mounted on the holder 91. In the example shown in FIG. 2, the number of the liquid containers 92 mounted is eight, but other plural numbers such as three, four, and ten may be used. The liquid container 92 is constituted by, for example, an ink cartridge or an ink tank. The recording head 53 has nozzles (not shown) for ejecting liquid such as ink supplied from the liquid container 92.

In a case where the number of liquid containers 92 is n and n≥2, the n liquid containers 92 respectively supply n different colors of ink to the recording head 53 through the tubes 93. In the case of n≥4, the four or more liquid containers 92 contain, for example, respectively inks of a plurality of colors including cyan, magenta, yellow, and black, which constitute colors. One or the plurality of tubes 93 for supplying the ink in the liquid container 92 to the recording head 53 extend from the holder 91. In the example shown in FIG. 2, the plurality of tubes 93 (for example, eight tubes), the number of which is the same as the number of the liquid containers 92 constituting the liquid supply section 90, are provided. A tube 93 connects the liquid supply section 90 and the carriage 52.

The recording unit 50 includes the carriage 52, the recording head 53 mounted in the carriage 52, and a fluid supply path section 50A for supplying fluid from the apparatus side to the carriage 52 or the recording head 53. The fluid supply path section 50A includes an elongated member 79 which is a transmission path of a transmission target such as a fluid supplied to the carriage 52 or the recording head 53, and a housing section 60 which houses the elongated member 79. In the present embodiment, the fluid is, for example, at least one of liquid such as ink and air. The elongated member 79 of the present embodiment includes a plurality of types that supply both liquid such as ink and air.

In this embodiment, at least one of the elongated members 79 is the tube 93 for supplying a liquid to the recording head 53. The housing section 60 houses one or the plurality of tubes 93 as an example of the elongated member 79. In the embodiment, the housing section 60 houses one or a plurality of tubes 94 (refer to FIG. 6) which supply air to the carriage 52 as another example of the elongated member 79. The fluid supply path section 50A may house a power line for supplying power or a signal line for transmitting a signal as another one of the elongated members 79.

The housing section 60 has a fixed end 61 and a moving end 62 at both ends in the longitudinal direction. Furthermore, the housing section 60 includes a variable section 63 that can be deformed into a curved shape in a portion between the fixed end 61 and the moving end 62. That is, the housing section 60 houses the elongated member 79 and has the fixed end 61 fixed to the apparatus side, the moving end 62 fixed to the carriage 52, and the elongated variable section 63 which is a variable section extending between the fixed end 61 and the moving end 62. The variable section 63 has a curved portion 66 which is a portion where the variable section 63 extending in parallel with the main scanning direction X is folded back in the middle. The curved portion 66 formed in the housing section 60 moves following the movement of the carriage 52.

The variable section 63 includes a first linear portion 64, a second linear portion 65, and the curved portion 66 that curves with a folded path at a portion between the first linear portion 64 and the second linear portion 65. The first linear portion 64 linearly extends from the fixed end 61 along the main scanning direction X. The second linear portion 65 linearly extends from the moving end 62 along the main scanning direction X. The fixed end 61 is fixed to a frame 12F constituting the support base 12. The moving end 62 is fixed to the carriage 52. As in the example illustrated in FIG. 1, in a case where the housing section 60 is disposed at a position separated from the carriage 52 in the Y direction, the moving end 62 may be fixed to a support portion extending from the carriage 52 in the Y direction. In addition, the disposition position of the housing section 60 is not limited to a position on the upstream side in the transporting direction Y with respect to the movement path of the carriage 52 as in the example illustrated in FIG. 1, and may be a position on the downstream side.

The housing section 60 illustrated in FIG. 2 follows the movement of the carriage 52 by sequentially moving the portion of the variable section 63 in which the curved portion 66 is formed. Accordingly, even when the carriage 52 moves in the main scanning direction X, it is possible to supply liquid to the recording head 53 through the tube 93 while protecting the tube 93 which supplies liquid such as ink to the carriage 52 from the liquid container 92.

As shown in FIG. 2, the carriage 52 is movable between a home position HP, which is one end of the movement path, and an anti-home position AH, which is the other end. As shown by the solid line in FIG. 2, when the carriage 52 is at the home position HP, the first linear portion 64, which is longer than the second linear portion 65, is substantially the longest. Further, as shown by the two-dot chain line in FIG. 2, when the carriage 52 is at the anti-home position AH, the first linear portion 64, which is shorter than the second linear portion 65, has substantially the shortest length. In a process in which the carriage 52 moves between the home position HP and the anti-home position AH, a portion in which the curved portion 66 is formed moves, and thus a ratio between the lengths of the first linear portion 64 and the second linear portion 65 changes.

Configuration of Linear Encoder 36

As shown in FIG. 2, the recording device 11 includes a linear encoder 36. The linear encoder 36 includes a linear scale 37 stretched along the main scanning direction X, and a sensor 38 provided on the carriage 52 in a state where the linear scale 37 can be detected. The sensor 38 is an optical sensor configured to detect light passing through a plurality of light transmitting portions (not shown) provided on the linear scale 37 at a constant pitch. The sensor 38 outputs an encoder signal including the number of pulses proportional to the movement amount of the carriage 52 to the control section 100 (refer to FIG. 1).

The control section 100 includes a counter (not shown) that counts the number of pulse edges of the encoder signal input from the sensor 38 of the linear encoder 36. The counter is reset when the carriage 52 is at the origin position on the movement path. The control section 100 acquires the carriage position, which is the position on the movement path of the carriage 52, from the count value of the counter. The control section 100 performs position control and speed control of the carriage 52 based on the encoder signal.

Maintenance Device 55

As shown in FIG. 2, a maintenance device 55 is disposed at a position facing the recording head 53 when the carriage 52 is at the home position HP. The home position HP is a standby position at the time of non-printing of the carriage 52. The maintenance device 55 includes a main body 56, a cap 57 that can be raised and lowered with respect to the main body 56, and a spring 58 which biases the cap 57. The maintenance device 55 may include a pump 59. The cap 57 is moved between a standby position indicated by a solid line in FIG. 2 and a capping position indicated by two dot chain line in FIG. 2. The cap 57 at the capping position is in state that pressed against the nozzle surface of the recording head 53 by the biasing force of the spring 58, and the cap 57 contacts with the nozzle surface. The nozzle surface is a surface on which the nozzles of the recording head 53 are opened.

A substantially closed room is formed between the cap 57 at the capping position and the recording head 53. In this capping state, thickening and drying of the ink in the nozzle are suppressed. When the cleaning timing is reached, the pump 59 is driven in the capping state, so that the pressure in the substantially closed room between the cap 57 and the recording head 53 becomes negative. When the pressure in the substantially closed room becomes negative, the ink is forcibly discharged from the nozzles. As a result, cleaning is performed in which bubbles, thickened ink, and the like in the nozzle are discharged together with the ink. The cleaning may be performed by pressurizing the diaphragm of the ink chamber with pressurized air supplied to the recording head 53 through a later-described air supply tube 94 (see FIG. 6) to forcibly discharge the ink from the nozzle communicating with the ink chamber. This type of pressurization cleaning may be performed by configuring the liquid container 92 to have an ink pack in a case and pressurizing the ink in the tube 93 by pressurizing the ink pack in the case using pressurized air.

Protection Structure of First Member 45

As shown in FIG. 2, a first member 45 is disposed below the housing section 60. The first member 45 is supported by the frame portion 46 positioned below the housing section 60. A plate member 47 is disposed between the housing section 60 and the first member 45 in the height direction HD. The first member 45 may be a component that accumulates or generates a transmission target transmitted by at least one of the elongated members 79 in the housing section 60. The first member 45 may be, for example, a pressure tank that accumulates pressurized air or negative pressure air, or an air generation unit that generates pressurized air or negative pressure air. In this case, the elongated members 79 may include the air supply tube 94 (see FIG. 6) as one of them. In this case, the tube 94 may supply pressurized air or negative pressure air.

When the total weight of the housing section 60 and the elongated members 79 such as the tubes 93 and 94 which are housed in the housing section 60 is increased, the housing section 60 may droop in the vertical direction Z. In this case, the plate member 47 shown in FIG. 2 is provided in order to restrict the drooping amount of the housing section 60 to a certain value or less. The plate member 47 is formed of, for example, a metal plate. Even in a case where the housing section 60 droops, the metal plate member 47 restricts the drooping of the housing section 60 so as not to be lower than a position at which the housing section 60 contacts or slides on the plate member 47. The metal plate member 47 has rigidity to such an extent that it is hardly warp even if it receives the weight of the drooping housing section 60. That is, the drooping amount of the fluid supply path section 50A is regulated by the plate member 47 so as not to come into contact with the first member 45.

Detailed Structure of Housing Section 60

Figure 3:
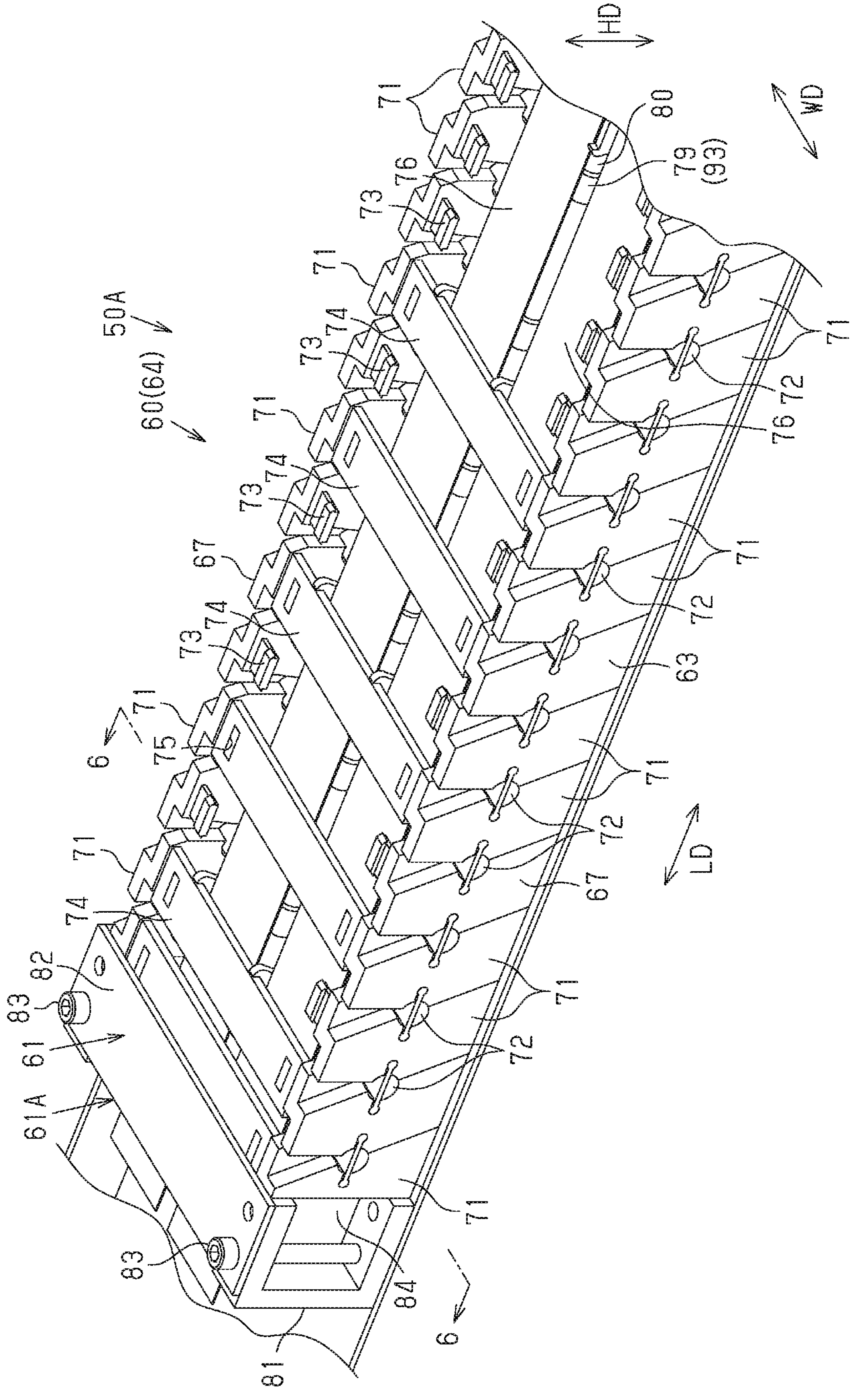
FIG. 3 is a perspective view showing a part of the fluid supply path section.

Next, a detailed configuration of the housing section 60 will be described with reference to FIGS. 3 to 7. FIG. 3 is a perspective view of a part of the housing section 60 close to the fixed end 61, in which a part of cover members 74 are removed so that the inside of the housing section 60 can be easily seen. As shown in FIG. 3, both sides 67 of the variable section 63 in the housing section 60 are constituted by a plurality of link members 71 which is coupled in a line via pins 72 in a state in which the adjacent portions are angularly variable. An upper portion and a lower portion of the housing section 60 are intermittently covered by the plurality of cover members 74 which are provided at intervals in the longitudinal direction LD, and erected in the width direction WD intersecting with the longitudinal direction LD. The cover members 74 have rectangular plate shapes elongated in the width direction WD. The link members 71 have locking portions 73 at both ends in the height direction HD (only the upper end is shown in FIG. 3). The cover members 74 have locked portions 75 which can be locked to the locking portions 73 at both ends in the width direction WD. In the example shown in FIG. 3, the locking portions 73 are locking projections, and the locked portions 75 are locked holes.

The interval at which the cover members 74 are arranged in the longitudinal direction LD of the housing section 60 can be selected by the user determining the positions at which the cover members 74 are attached. The plurality of cover members 74 are locked in a state of being bridged between both sides of at least a part of the link members 71 paired on both sides in the width direction WD among the plurality of link members 71. Thus, in the longitudinal direction LD, the plurality of cover members 74 are arranged at intervals at a pitch of M times, the pitch of the link members 71 in the longitudinal direction, M being a natural number.

In the example shown in FIG. 3, the plurality of cover members 74 are arranged at intervals of every other one with respect to the link members 71 arranged in a line in the longitudinal direction LD. That is, the plurality of cover members 74 are arranged at a pitch twice (M=2) the pitch of the link members 71 in the longitudinal direction LD. The pitch of the cover members 74 are arranged at three times (M=3) of the link members 71, four times (M=4) of the link members 71, or the same pitch (M=1) of the link members 71 may be selected, appropriately.

Figure 4:
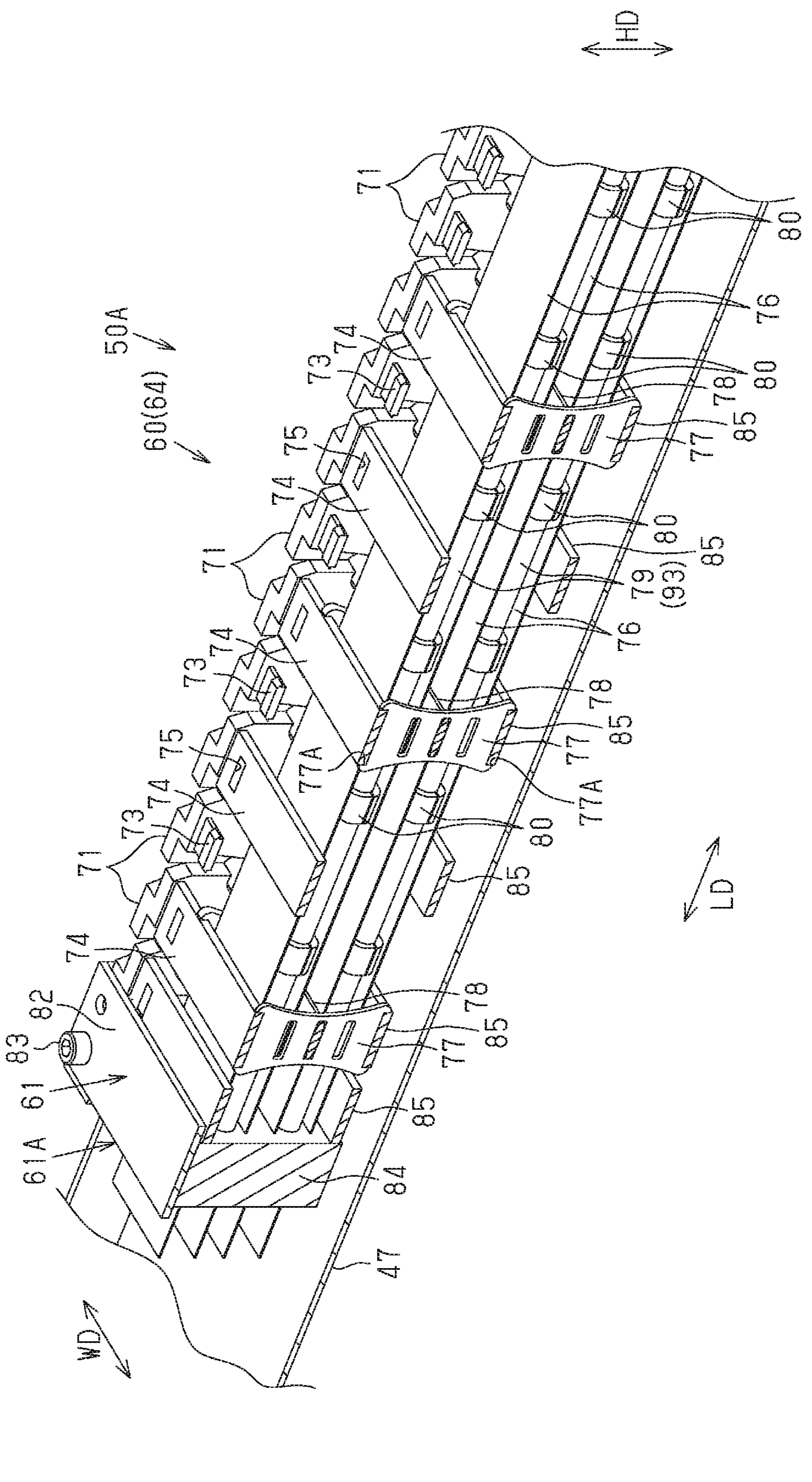
FIG. 4 is a partial perspective view showing a part of the fluid supply path section.

In FIG. 4, a cover member 85 constituting the lower portion of the housing section 60 is attached by basically the same attachment structure as the plurality of cover members 74 constituting the upper portion of the housing section 60. That is, in case of the lower cover member 85, the cover members 85 are also disposed at the same position and at the same pitch as the upper cover members 74 in the longitudinal direction LD by the locking portion at the lower end of the link member 71 is locked to the locked portion at both end portions of the cover members 85.

As shown in FIG. 3, the link member 71 has a tapered shape in which the width dimension of the upper portion in FIG. 3, which is the inner side of the curved portion 66 of the housing section 60, becomes narrower toward the upper end. In the first linear portion 64 shown in FIG. 3, the lower portions of the plurality of link members 71 adjacent to each other are abutted against each other, so that the link members 71 are restricted so as not to be rotatable in a direction in which the link members 71 come closer to each other. In addition, the plurality of link members 71 are configured to change an angle in a direction in which the link members approach each other from a position in which upper portions of the adjacent link members are positioned with a gap therebetween.

In FIG. 3, the housing section 60 can be curved in one direction in which the upper side is the inner circumferential side, but is restricted from being curved in the opposite direction. For this reason, the second linear portion 65 positioned on the upper side is held in a linear shape even when receiving a load in the vertical direction Z such as gravity. On the other hand, the first linear portion 64 located at the lower side is supported by the plate member 47, so that it is held in a linear shape.

Structure for Preventing Abrasion of Elongated Member in Housing Section 60

Next, with reference to FIGS. 3 and 4, a structure for preventing abrasion of the elongated member in the housing section 60 will be described. As shown in FIG. 3, film member 76, having flexibility, is disposed between the elongated member 79 and the housing section 60 in the height direction HD of the housing section 60. Here, the height direction HD is a direction crossing the longitudinal direction LD of the housing section 60. The height direction HD is a direction that also intersects the width direction WD of the housing section 60. The height direction HD corresponds to a radial direction in the curved portion 66. Members constituting the variable section 63 of the housing section 60, that is, the link member 71, the cover members 74, a first partition plate 77 (described later), a second partition plate 78, and a cover member 85 (all see FIG. 4), are made of synthetic resin. The film member 76 is made of, for example, a synthetic resin.

A coefficient of friction between the film member 76 and the elongated member 79 is smaller than a coefficient of friction between the housing section 60 and the elongated member 79. More specifically, the coefficient of friction of the elongated member 79 with respect to the film member 76 is smaller than the coefficient of friction with respect to any of the cover members 74, the first partition plate 77, the second partition plate 78, and the cover member 85, (all see FIG. 4), of the housing section 60. When the elongated member 79 is, for example, the tube 93, the tube 93 is made of, for example, rubber. When the tube 93 is made of rubber, the material of the tube 93 is not limited to synthetic rubber, and may be natural rubber. As a material of the film member 76, a resin material is selected in which a coefficient of friction with respect to a synthetic resin which is a material of a member constituting the variable section 63 is smaller than a coefficient of friction with respect to rubber.

The film member 76 is made of a low-friction resin material. The low-friction resin material is, for example, a biaxially oriented polyester (PET) film. The film member 76 is, for example, Lumirror®. The film member 76 may be a film other than Lumirror® as long as it is made of a low-friction resin material.

In the curved portion 66, the displacement amount in the longitudinal direction LD (circumferential direction in the curved portion 66) is different between the inner circumferential side and the outer circumferential side. That is, in the curved portion 66, the displacement amount on the outer circumferential side is larger than the displacement amount on the inner circumferential side. Due to the difference between the displacement amount on the inner circumferential side and the displacement amount on the outer circumferential side in the curved portion 66, sliding occurs between the housing section 60 and the elongated member 79 in the curved portion 66. In the present embodiment, the elongated member 79 does not slide on the housing section 60, but slides on the film member 76 interposed between the elongated member 79 and the housing section 60. Therefore, the sliding frictional force received when the elongated member 79 slides on the curved portion 66 is smaller than the sliding frictional force received when the elongated member 79 directly slides on the cover members 74 and 85 and the partition plates 77 and 78.

Configuration of Fixing Mechanism 61A

FIG. 4 shows a state in which the housing section 60 is cut along the longitudinal direction LD at a position about half of the width direction WD. As shown in FIGS. 3 and 4, the fixed end 61 is provided with a fixing mechanism 61A for fixing an end portion of the variable section 63 to an object of a fixing destination. The fixing mechanism 61A includes an elastic member 84 through which the elongated member 79 is inserted, a holding member 81 and a pressing plate 82 that sandwich the elastic member 84, and a bolt 83 as an example of a fastening member that fastens the pressing plate 82 to the holding member 81. Since the holding member 81 and the pressing plate 82 are fastened by the bolt 83 with the elastic member 84 interposed therebetween in the fixing mechanism 61A, the load due to the fastening force received by the elongated member 79 is reduced.

Partition Configuration by Partition Plates 77 and 78 in Housing Section 60

Figure 5:
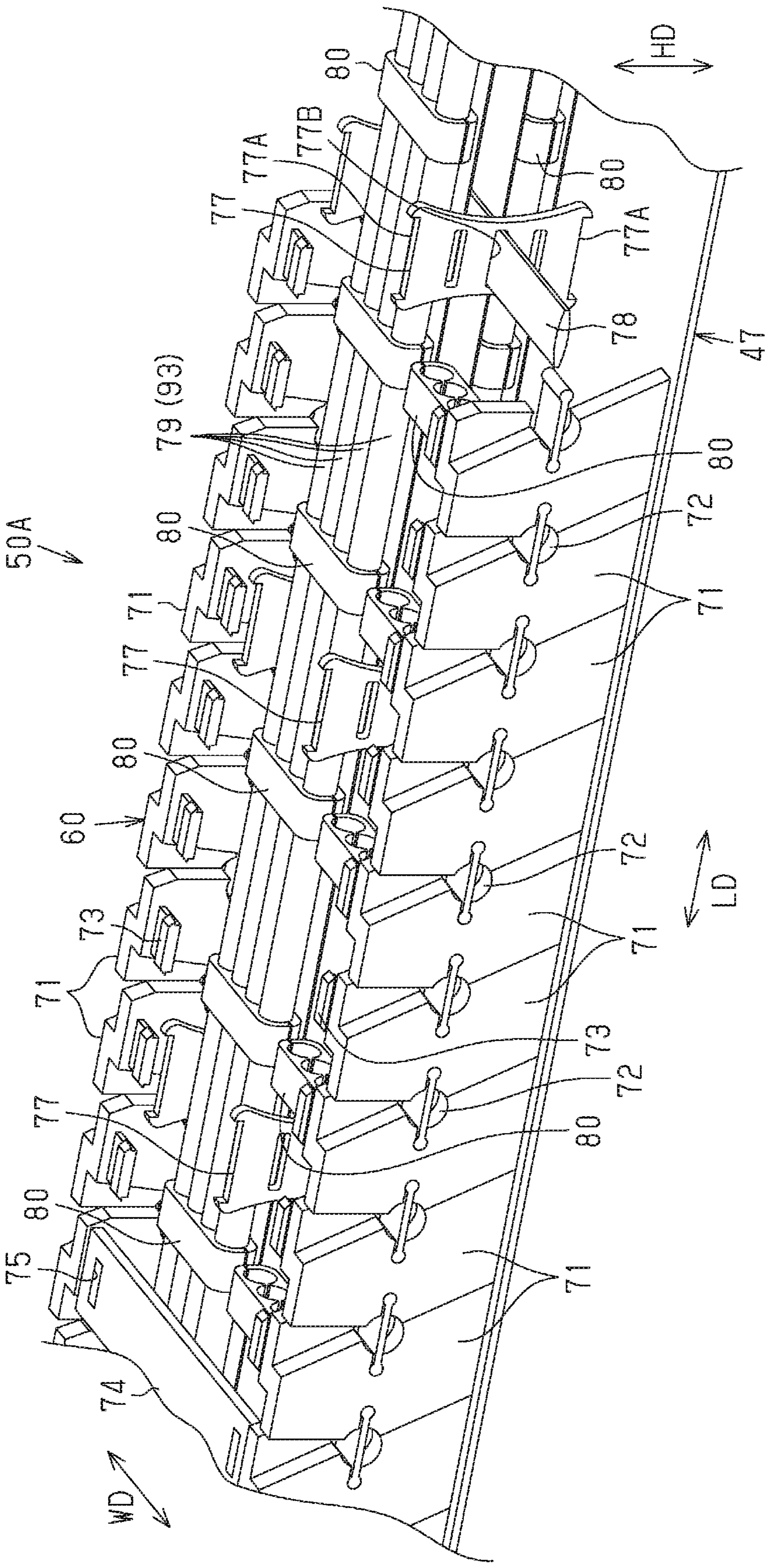
FIG. 5 is a perspective view showing a part of the fluid supply path section.
Figure 6:
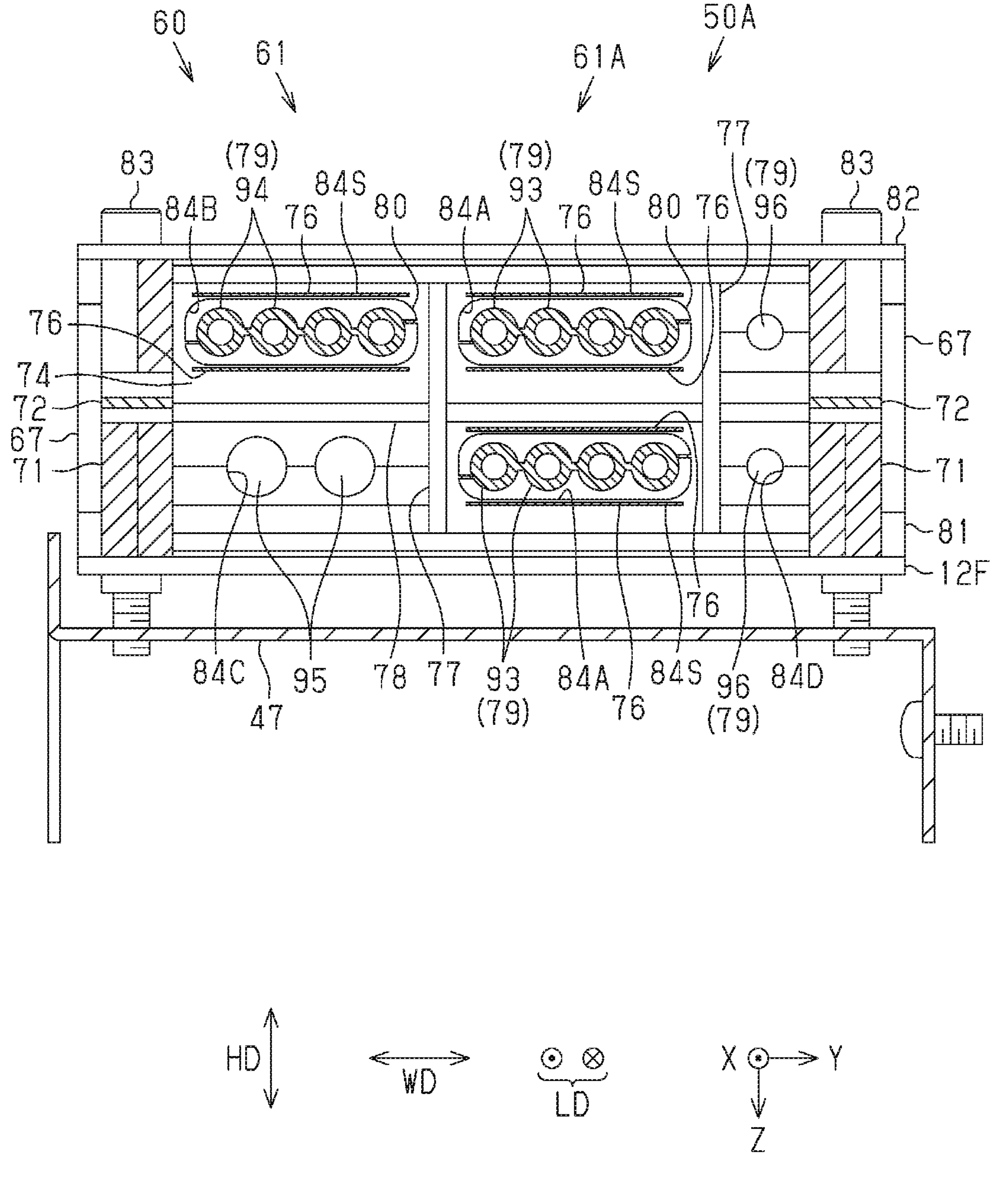
FIG. 6 is a sectional view taken along a chain line 6-6 in FIG. 3 as viewed in an arrow direction.

FIG. 5 shows a perspective view in a state where the cover members 74 and one sheet of the film member 76 are removed. FIG. 6 is a cross-sectional view of the housing section 60 taken along chain line 6-6 as viewed in arrow direction in FIG. 3. As shown in FIGS. 4 to 6, the housing section 60 includes the first partition plates 77 as an example of a plurality of partition plates disposed at positions where the inside of the housing section 60 can be partitioned into a plurality of housing regions in the width direction WD. The plurality of first partition plates 77 are arranged at predetermined intervals in the longitudinal direction LD. In the example shown in FIGS. 4, 6 and the like, the first partition plates 77 partitions the inside of the housing section 60 into three housing regions in the width direction WD. The first partition plates 77 suppresses displacement of the elongated member 79 housed in each housing region in the width direction WD. That is, the first partition plates 77 has a function of holding each of the elongated members 79 in each of the housing regions.

As shown in FIGS. 4 to 6, the second partition plate 78 is provided in the housing section 60 so as to extend in the width direction WD at a height position where the height of the housing section 60 is divided into two. As shown in FIG. 5, the first partition plate 77 has a plurality of insertion holes 77B in the height direction HD, and the second partition plate 78 is inserted into at least one insertion hole 77B selected. In the example shown in FIGS. 4 to 6, the second partition plate 78 is inserted into the insertion hole 77B positioned at the center that divides the height of the first partition plate 77 into two, thereby vertically partitioning the inside of the housing section 60 into two housing regions. Further, the first partition plate 77 has locking recesses 77A at both ends in the height direction HD. The cover members 74 and 85 are suspended in the width direction WD by engaging both end portions in the width direction WD with the locking recesses 77A.

The first partition plates 77 and the second partition plates 78 divide the inside of the housing section 60 into six housing regions in the vertically and horizontally directions. As shown in FIG. 6, the elongated member 79 are housed in each of the six partitioned housing regions for each group.

Configuration of Fixing Mechanism 61A

As shown in FIG. 6, the fixed end 61 and the moving end 62 constituting the housing section 60 are fixed to a fixing target via the fixing mechanism 61A in a state where one or a plurality of elongated members 79 are housed in a housing region in the housing section 60. More specifically, the fixed end 61 is fixed to the frame 12F on the apparatus side via the fixing mechanism 61A. The fixing mechanism 61A has the same basic configuration at the fixed end 61 and the moving end 62. Therefore, an example of the fixed end 61 will be described below.

As shown in FIG. 6, the fixing mechanism 61A includes the frame 12F, the holding member 81 fixed to the upper side of the frame 12F, and a pressing plate 82 disposed at the upper surface of the holding member 81. The bolt 83 is inserted through the pressing plate 82 and the holding member 81. The frame 12F is provided with a screw hole into which the male screw of the bolt 83 can be screwed.

An area surrounded by the holding member 81 and the pressing plate 82 serves as a passage for the elongated member 79. The elastic member 84 is disposed in the area surrounded by the holding member 81 and the pressing plate 82. The elastic member 84 has a plurality of insertion holes 84A, 84B, 84C, and 84D, and slits 84S. The elastic member 84 may be formed of a single member, or may be formed by stacking a plurality of elastic components to be assembled as a whole.

As shown in FIG. 6, a clamping member 80 attached to the ink supply tube 93 is inserted into an insertion hole 84A in a fitted state. A clamping member 80 attached to the air supply tube 94 is inserted into the insertion hole 84B in a fitted state. Power lines 95 are inserted into the insertion hole 84C in a fitted state. The power lines 95 supply electric power to the recording head 53. Two power lines 95 are, for example, a power supply line and a ground line. A cable such as an optical cable 96 for optical communication is inserted into the insertion hole 84D in a fitted state. The slits 84S are positioned above and below the insertion holes 84A and 84B through which the clamping member 80 is inserted. The film member 76 is inserted into the slit 84S.

By fastening the plurality of bolts 83 in this manner, the elastic member 84 sandwiched between the holding member 81 and the pressing plate 82 is pressed. At this time, since the fastening force of the bolt 83 is defused by the elastic member 84, it is hard to act on the elongated member 79. Therefore, the elongated member 79 is fixed to the frame 12F on the apparatus side in a protected state by the fixing mechanism 61A at the fixed end 61. The moving end 62 is fixed to the carriage 52 via the fixing mechanism 61A in a state where the elongated member 79 is in a protected state by the elastic member 84.

Clamping Member 80

Figure 7:
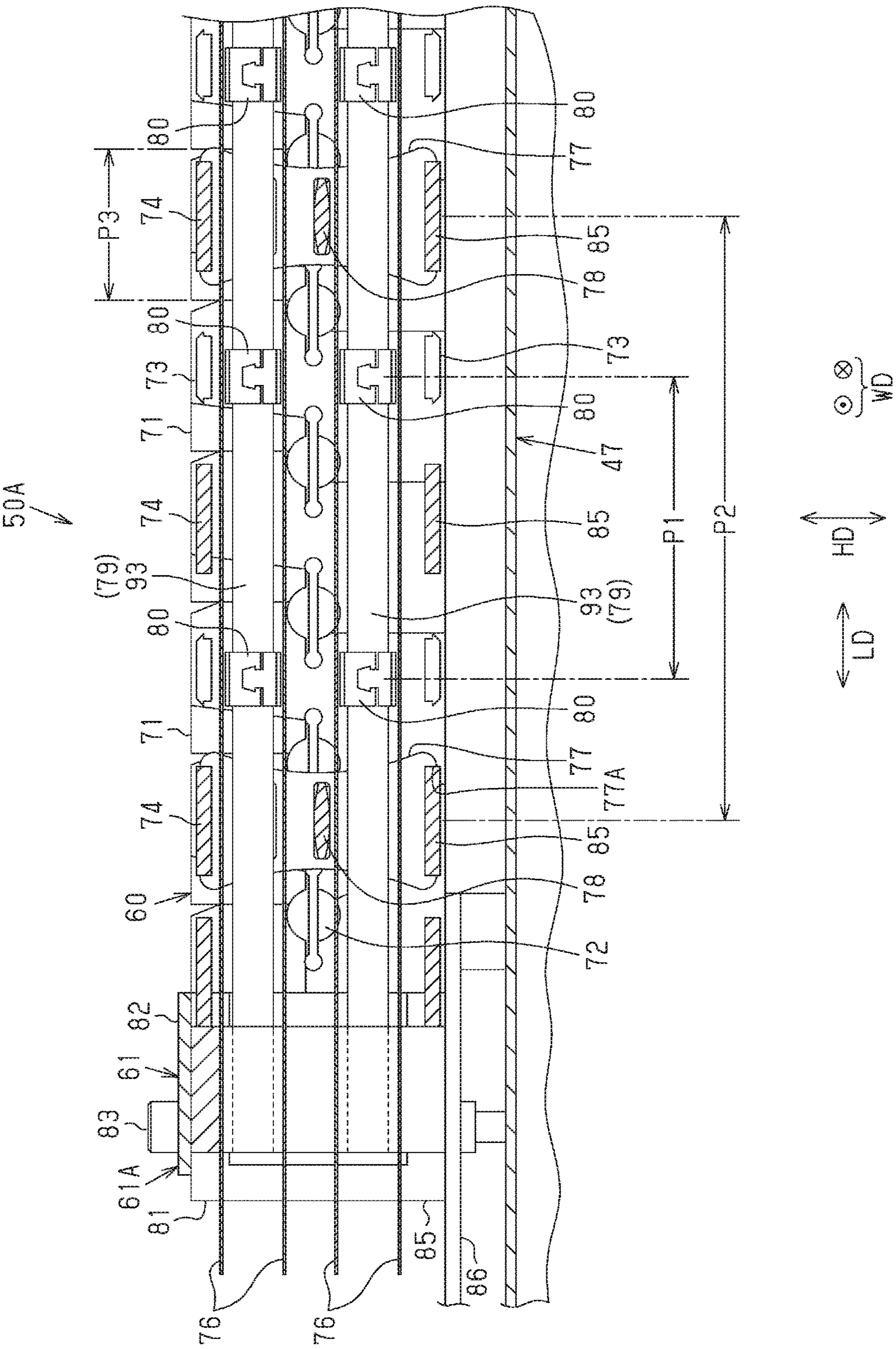
FIG. 7 is a front cross-sectional view showing the fluid supply path section.

As shown in FIGS. 4, 5, and 7, the fluid supply path section 50A includes one or a plurality of clamping members 80 which are attached to the elongated member 79 at intervals in the longitudinal direction LD of the elongated member 79. In the example shown in FIG. 5 and the like, a plurality of clamping members 80 are attached to the elongated member 79. The plurality of clamping members 80 are attached, for example, at uniformly intervals in the longitudinal direction of the elongated member 79.

In the examples shown in FIGS. 4, 5 and 7, the elongated member 79 to which the clamping member 80 is attached is a tube 93. In the tube 93 of this embodiment, a plurality of tubes (for example, four tubes) are coupled in a row in the width direction WD. The clamping member 80 holds the plurality of tubes 93 coupled in a row in a state where the tubes 93 are arranged in a row in order to prevent the tubes 93 from being twisted. The clamping member 80 has a plurality of insertion holes through which the tubes 93 of one row can be inserted, and the tubes 93 are inserted into the respective insertion holes one by one to integrally hold the plurality of tubes 93. Therefore, the clamping member 80 protrudes radially outward in a convex shape over the entire circumference of the portion of the plurality of tubes 93 to which the clamping member 80 is attached.

The tube 93 is housed in the housing section 60 in a state where both sides of the housing section 60 in the height direction HD are covered with the film member 76. Therefore, the film member 76 does not exist on the side of the tube 93 in the width direction WD. However, since the clamping member 80 attached to the tube 93 comes into contact with the inner wall of the housing section 60, the tube 93 is easily prevented from coming into contact with the inner wall of the housing section 60. For example, the clamping member 80 comes into contact with the first partition plate 77, making the tube 93 easier to prevent from coming into contact with the first partition plate 77.

As shown in FIG. 7, in the longitudinal direction LD, a pitch at which the clamping members 80 are arranged is denoted P1, a pitch at which the partition plates 77 and 78 are arranged is denoted P2, and a pitch of the link members 71 is denoted P3. The partition plates 77 and 78 are arranged at a pitch P2 which is N times of the pitch P3 of the link members 71 in the longitudinal direction LD, N being a natural number. The plurality of clamping members 80 are attached to the elongated member 79 at a pitch P1 that is shorter than the pitch P2 at which the partition plates 77 and 78 are disposed. Thus, in the curved portion 66, even when the positional relationship between the clamping member 80 and the partition plates 77 and 78 in the longitudinal direction LD is displaced, one or two clamping member 80 out of a plurality of clamping member 80 at a constant ratio among all the clamping member 80 abut on the partition plates 77 and 78 directly or via the film member 76. Thus, the tubes 93 and 94 are prevented from abutting the partition plates 77 and 78.

Positional Relationship Between Clamping Member 80 and Partition Plates 77 and 78

Figure 8:
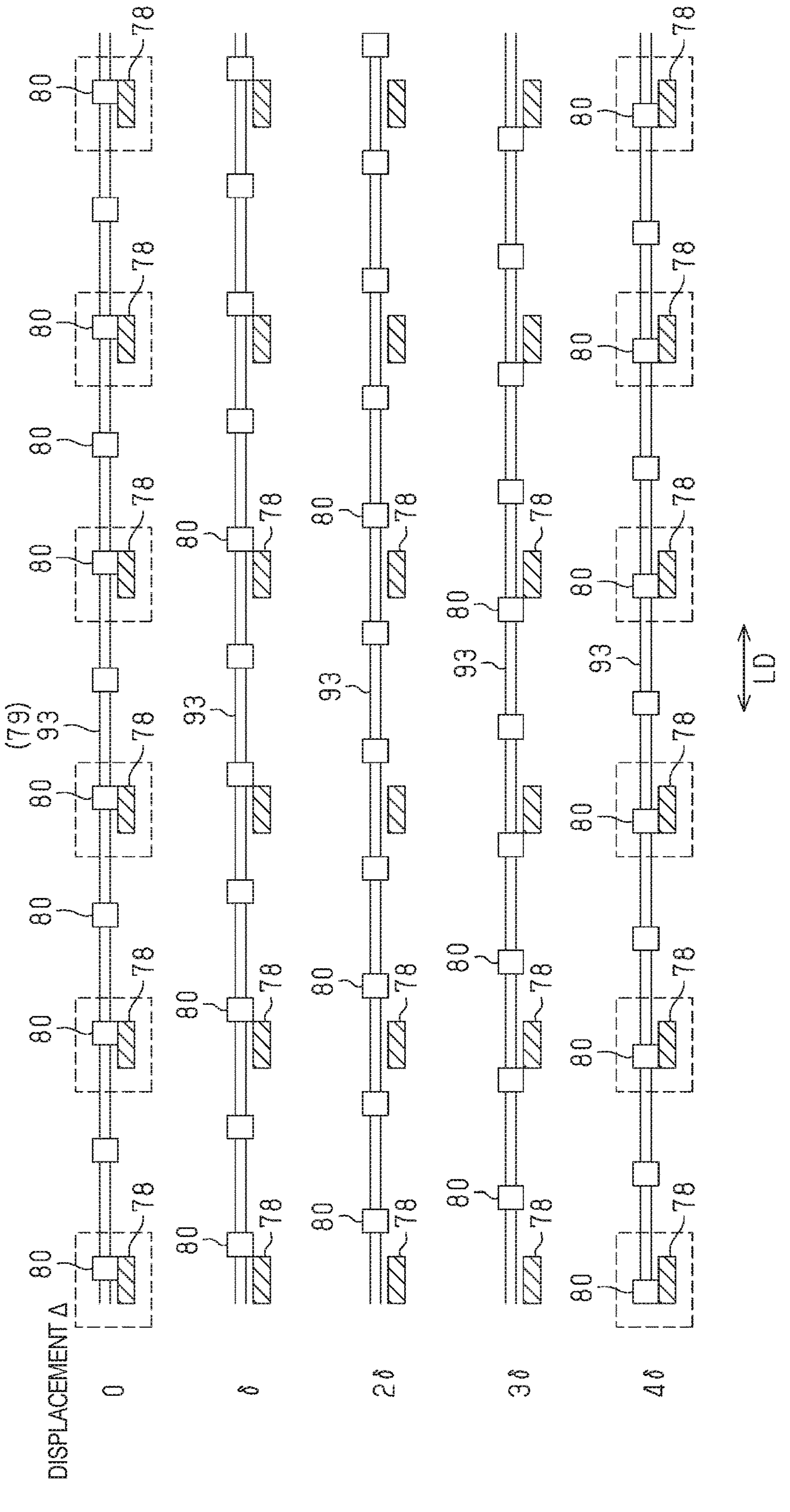
FIG. 8 is a schematic front view showing the fluid supply path section of the comparative example.
Figure 9:
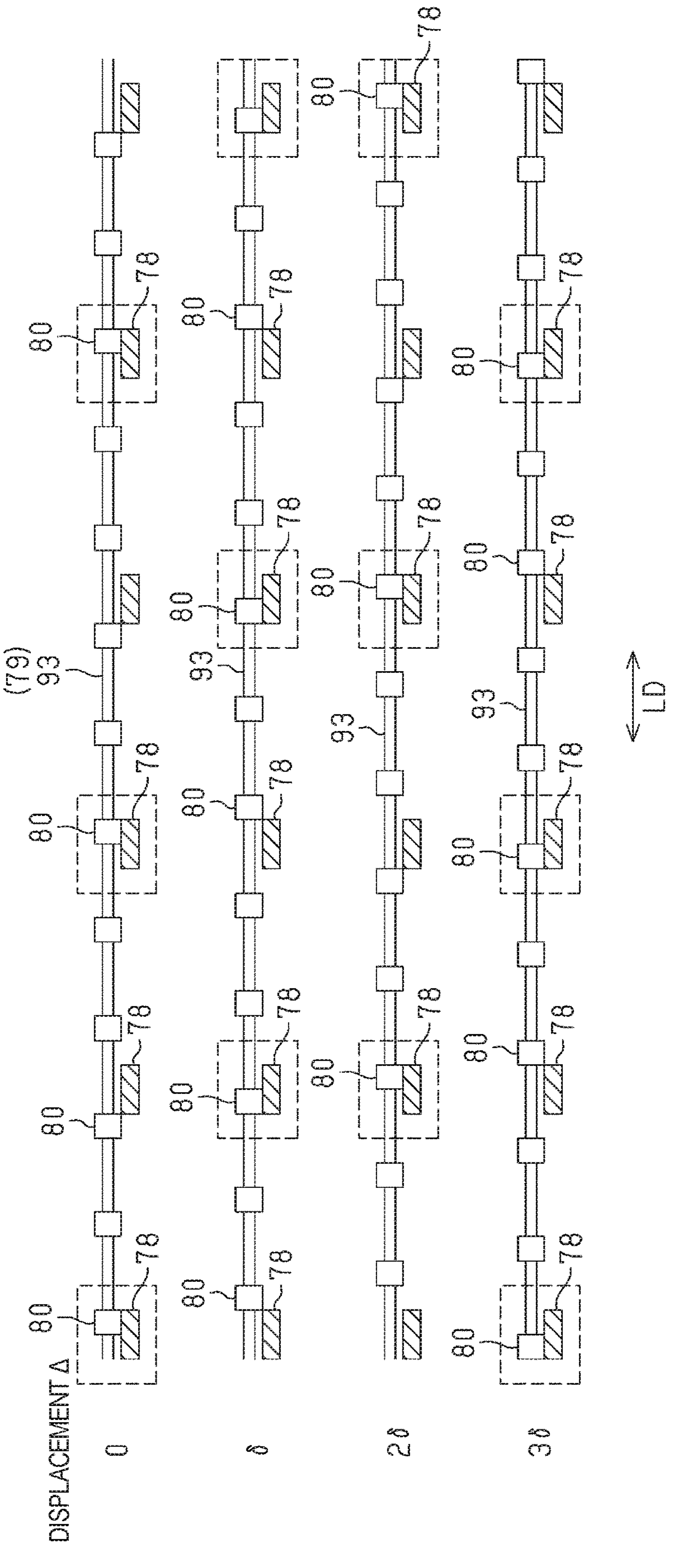
FIG. 9 is a schematic front view showing the fluid supply path section of the first embodiment.
Figure 10:
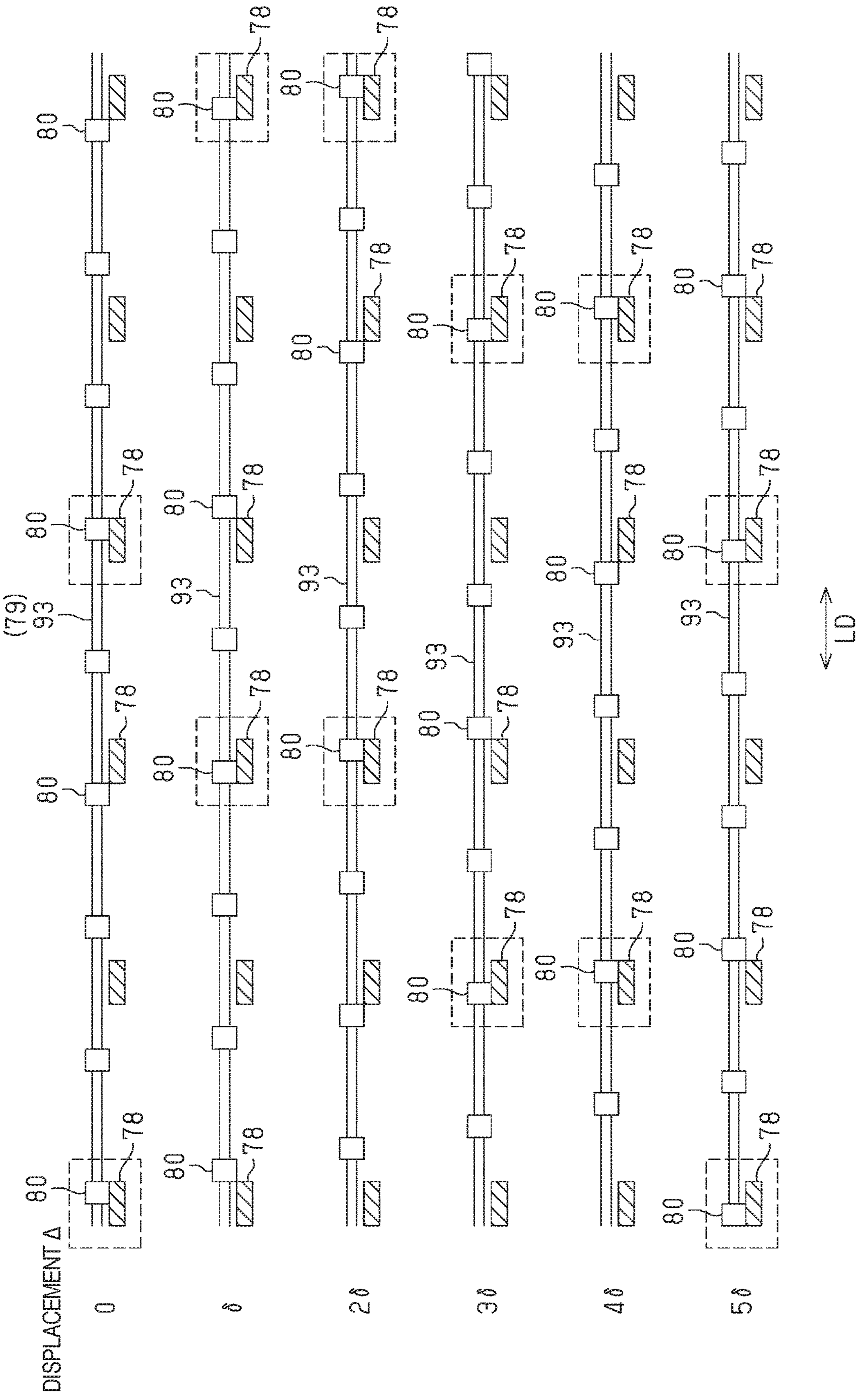
FIG. 10 is a schematic front view showing the fluid supply path section of the second embodiment.

Next, the positional relationship in the longitudinal direction LD between the clamping member 80 and the partition plates 77 and 78 will be described with reference to FIGS. 8 to 10. FIGS. 8 to 10 schematically show the positional relationship along the longitudinal direction LD between the clamping member 80 and the second partition plate 78 (hereinafter, also simply referred to as the partition plate 78) in the curved portion 66 of the housing section 60.

Since the positions of the first partition plate 77 and the second partition plate 78 in the longitudinal direction LD can be basically considered to be substantially the same, FIGS. 8 to 10 show examples of the second partition plate 78. There are some case, that the first partition plate 77 also is displaced between the elongated member 79 and the inner wall of the housing section 60 due to a difference in displacement between the inner circumferential side and the outer circumferential side. FIGS. 8 to 10 are views in which the curved path of the curved portion 66 is developed into a horizontal path. FIG. 8 shows the positional relationship between the clamping member 80 and the partition plate 78 of the comparative example in the curved portion 66. In FIGS. 8 to 10, the film member 76 is omitted.

In FIGS. 8 to 10, a portion, where the clamping member 80 and the partition plate 78 are in a positional relationship, in which the clamping member 80 is in contact with the partition plate 78 via the film member 76, in the longitudinal direction LD, is surrounded by a dashed rectangular frame. Since the film member 76 is drooped, when all or many of the clamping members 80 are displaced from the partition plate 78 in the longitudinal direction LD, the tube 93 comes into contact with the partition plate 78 via the film member 76. At this time, an excessive pressure is applied to a portion of the tube 93 corresponding to the partition plate 78, and when the tube 93 slides in this state, the tube 93 is likely to locally receive an excessive sliding frictional force even if the film member 76 is interposed between the tube 93 and the partition plate 78. Further, since the film member 76 is not present on the side part of the tube 93, when all or many of the clamping members 80 are displaced from the first partition plate 77 in the longitudinal direction LD, the tube 93 is likely to come into contact with the first partition plate 77. These points also apply to the air supply tube 94.

Comparative Example

First, a comparative example in which the pitch ratio between the clamping member 80 and the partition plate 78 is inappropriate will be described with reference to FIG. 8. In the curved portion 66, the positional relationship between the clamping member 80 and the partition plate 78 along the longitudinal direction LD is displaced due to the difference in displacement amount along the longitudinal direction LD between the inner circumferential side and the outer circumferential side. This displacement does not occur in the linear portions 64 and 65, but occurs in the curved portion 66. Further, the amount of displacement increases as it advances along the curved portion 66 after entering the curved portion 66.

The positional relationship between the clamping member 80 and the partition plate 78 in the linear portions 64 and 65 is assumed to be the displacement $\Delta=0$. P1 stand for the pitch of the clamping member 80, and P2 stand for the pitch of the partition plates 78. FIG. 8 shows an example in which the relationship of $2*P1=P2$ is satisfied. The dimension of the clamping member 80 in the longitudinal direction LD is defined as d1, and the dimension of the partition plate 78 in the longitudinal direction LD as d2. Here, the relationship of $d1=d2/2$ is established. A displacement equal to the dimension d1 in the longitudinal direction LD of the clamping member 80 is defined as $\delta$. The displacement $\Delta$ between the clamping member 80 and the partition plate 78 is as shown in FIG. 8. When the displacement is $\delta$, the positional relationship between all the clamping member 80 and all the partition plate 78 is displaced.

When the displacement is $2\delta$, the positional relationship between all the clamping member 80 and the partition plate 78 is also displaced. Further, when the displacement is $3\delta$, the positional relationship between all the clamping member 80 and the partition plate 78 is displaced. Then, when the displacement is $4\delta$, the positional relationship between some of the plurality of clamping member 80 and the partition plate 78 is not displaced. That is, a part of the clamping member 80 is supported by the partition plate 78.

First Embodiment

Next, the first embodiment will be described with reference to FIG. 9. The first embodiment is different from the comparative example, described above, in the ratio of the pitch between the clamping member 80 and the partition plate 78. In FIG. 9, only the pitch of the clamping member 80 is different from the comparative example. In the first embodiment, one of the five clamping members 80 is positioned on the outer circumferential side (the upper side in FIG. 9) of the partition plate 78. Thus, one of every five clamping members 80 can be supported by the partition plate 78. Even if the displacement Δ increases by δ, one of the five clamping member 80 is positioned on the outer circumferential side of the partition plate 78. That is, even if the displacement Δ changes by the displacement δ, the clamping members 80 are supported by the partition plate 78 at a ratio of one clamping member 80 to five clamping members 80.

Specifically, when the displacement Δ is 0, the clamping members 80 are positioned one by one on the outer circumferential side of the first, third, and fifth from left, the partition plates 78.

When the displacement Δ is δ, one clamping member 80 is positioned one by one on the outer circumferential side of each of the second, fourth, and sixth from left, the partition plates 78.

When the displacement is 2δ, one clamping member 80 is positioned one by one on the outer circumferential side of each of the second, fourth, and sixth from left, the partition plates 78.

Further, when the displacement Δ is 3δ, one clamping member 80 is positioned one by one on the outer circumferential side of each of the first, third, and fifth from left, the partition plates 78.

Second Embodiment

Next, a second embodiment will be described with reference to FIG. 10. The second embodiment is different from the first embodiment in the ratio of the pitch between the clamping member 80 and the partition plate 78. In FIG. 10, only the pitch of the clamping member 80 is different from those of the comparative example and the first embodiment. In the second embodiment, one of the five clamping members 80 is positioned on the outer circumferential side (upper side in FIG. 10) of the partition plate 78. Thus, one of every five clamping members 80 can be supported by the partition plate 78. Even when the displacement Δ is largely changed by each δ, one of the five clamping members 80 is positioned on the outer circumferential side of the partition plate 78. That is, even if the displacement Δ changes by the displacement δ, the clamping members 80 are supported by the partition plate 78 at a ratio of one clamping member 80 to five clamping members 80.

Specifically, when the displacement Δ is 0, one clamping member 80 is positioned one by one on the outer circumferential side of each of the first and fourth from left, the partition plates 78.

When the displacement Δ is δ, one clamping member 80 is positioned one by one on the outer circumferential side of each of the third and sixth from left, the partition plates 78.

When the displacement Δ is 2δ, one clamping member 80 is positioned one by one on the outer circumferential side of each of the third and sixth from left, the partition plates 78.

Further, when the displacement Δ is 3δ, one clamping member 80 is positioned one by one on the outer circumferential side of each of the second and fifth from left, the partition plates 78.

In addition, when the displacement Δ is 4δ, one clamping member 80 is positioned one by one on the outer circumferential side of each of the second and fifth from left, the partition plates 78.

Then, when the displacement Δ is 5δ, one clamping member 80 is positioned one by one on the outer circumferential side of each of the first and fourth from left, the partition plates 78.

Action of Embodiment

Next, the action of the recording device 11 will be described. When printing is performed by the recording device 11, the recording head 53 which moves together with the carriage 52 performs recording on the medium M while the carriage 52 moves in the main scanning direction X. The transporting operation to the next recording position of the medium M and the recording operation for recording on the medium M are performed alternately, so that an image or the like is recorded on the medium M.

When the carriage 52 moves in the main scanning direction X, the housing section 60 follows the movement of the carriage 52, thereby changing the position of the curved portion 66. Since the amount of displacement is different between the inner circumference and the outer circumference of the curved portion 66, a relative movement occurs between the elongated member 79 and the housing section 60 due to the difference in the amount of displacement. At this time, the elongated member 79 slides with respect to the film member 76 interposed between the elongated member 79 and the housing section 60.

The coefficient of friction of the elongated member 79 with respect to the film member 76 is smaller than the coefficient of friction of the elongated member 79 with respect to the housing section 60. Therefore, the sliding frictional force applied to the elongated member 79 is smaller than that in a configuration in which the film member 76 is not interposed between the housing section 60 and the elongated member 79. As a result, the abrasion of the elongated member 79 is suppressed to a small level. Therefore, even if the recording device 11 is used for a long period of time, it is possible to suppress the occurrence of scratches, breakage, and the like caused by the abrasion of the elongated member 79.

In addition, since the plate member 47 is disposed between the housing section 60 and the first member 45, the housing section 60 is supported by the plate member 47, so that thus is prevented from drooping further downward. As the result, it is possible to suppress abrasion or damage of the housing section 60 and the first member 45, due to the drooping housing section 60 hitting the first member 45.

Further, a plurality of clamping member 80 are attached to at least the tube 93 of the elongated member 79 at intervals in the longitudinal direction LD thereof. Therefore, the clamping member 80 comes into contact with the inner wall of the housing section 60, that is, the first partition plate 77, whereby the side portion of the tube 93 is protected.

Second partition plates 78 are positioned below the tube 93 at predetermined intervals in the longitudinal direction LD. The partition plates 78 partition the area in the housing section 60 into a plurality of storage regions in the height direction HD. Four tubes 93 are integrally connected in the width direction WD. Four tubes 93 are housed in one housing region. The tubes 93 are ink tubes for supplying ink. Therefore, the number of tubes 93 is eight, which is the same as the number of liquid containers 92. Then, four tubes 93 are housed in the respective housing regions.

A portion of the tube 93 which comes into contact with the partition plate 78 via the film member 76 is subjected to a larger contact pressure than a portion of the tube 93 which does not come into contact with the partition plate 78, and is strongly pressed by the contact pressure to be deformed. Note that the tube 94 (see FIG. 6) for supplying air is also housed as a tube in the housing section 60. The air supply tube 94 also has a configuration in which four tubes are integrally connected in the same manner, and the four tubes are housed in one housing area.

As shown in FIG. 9, in the first embodiment, one of the five clamping members 80 is positioned on the outer circumferential side (upper side in FIG. 9) of the partition plate 78. The displacement changes according to the position of the curved portion 66. Even when the displacement Δ increases by each δ, one of the five clamping members 80 is positioned outside the partition plate 78. In other words, even if the displacement Δ displaces by the displacement δ, one of the five clamping members 80 is supported by the partition plate 78.

As shown in FIG. 9, when the displacement Δ is 0, the clamping members 80 are positioned one by one on the outer circumferential side of the first, third, and fifth partition plates 78 from the left.

When the displacement Δ is δ, one clamping member 80 is positioned one by one on the outer circumferential side of each of the second, fourth, and sixth from left, the partition plates 78.

When the displacement is 2δ, one clamping member 80 is positioned one by one on the outer circumferential side of each of the second, fourth, and sixth from left, the partition plates 78.

Further, when the displacement Δ is 3δ, one clamping member 80 is positioned one by one on the outer circumferential side of each of the first, third, and fifth from left, the partition plates 78.

In this way, the clamping members 80 are supported by the partition plates 78 at a ratio of one clamp member 80 to five clamp members 80 regardless of the displacement Δ.

As shown in FIG. 10, in the second embodiment, one of the five clamping member 80 is positioned on the outer circumferential side (upper side in FIG. 10) of the partition plate 78. Thus, one of every five clamping members 80 can be supported by the partition plate 78. Even when the displacement Δ increases by each δ, one of the five clamping members 80 is positioned on the outer circumferential side of the partition plate 78. In other words, even if the displacement Δ displaces by the displacement δ, one of the five clamping members 80 is supported by the partition plate 78.

Specifically, when the displacement Δ is 0, one clamping member 80 is positioned one by one on the outer circumferential side of each of the first and fourth from left, the partition plates 78.

When the displacement Δ is δ, one clamping member 80 is positioned one by one on the outer circumferential side of each of the third and sixth from left, the partition plates 78.

When the displacement Δ is 2δ, one clamping member 80 is positioned one by one on the outer circumferential side of each of the third and sixth from left, the partition plates 78.

Further, when the displacement Δ is 3δ, one clamping member 80 is positioned one by one on the outer circumferential side of each of the second and fifth from left, the partition plates 78.

In addition, when the displacement Δ is 4δ, one clamping member 80 is positioned one by one on the outer circumferential side of each of the second and fifth from left, the partition plates 78.

Then, when the displacement Δ is 5δ, one clamping member 80 is positioned one by one on the outer circumferential side of each of the first and fourth from left, the partition plates 78.

In this way, the clamping members 80 are supported by the partition plates 78 at a ratio of one clamp member 80 to five clamp members 80 regardless of the displacement Δ.

As described above, in the first embodiment and the second embodiment, since the clamping member 80 is supported by the partition plate 78, the elongated member 79 (for example, the tubes 93 and 94), which is a portion other than the clamping member 80, is prevented from butting the partition plate 78 through the film member 76.

Therefore, according to the embodiment, the following effects are obtained.

(1) The recording device 11 includes the carriage 52 which is provided with the recording head 53 for recording on the medium M and is movable in the main scanning direction X, an elongated member 79 of which one end is connected to the recording head 53 or the carriage 52, and the elongated housing section 60. The housing section 60 houses the elongated member 79, and includes the fixed end 61 fixed to the apparatus side, the moving end 62 fixed to the carriage 52, and the elongated variable section 63 which is a variable portion extending between the fixed end 61 and the moving end 62. The curved portion 66, which is a portion at which the variable section 63 extending in parallel with the main scanning direction X is folded back, moves following the movement of the carriage 52. In the height direction HD intersecting the longitudinal direction LD of the housing section 60, the film member 76 having flexibility is disposed between the elongated member 79 and the housing section 60. A coefficient of friction between the film member 76 and the elongated member 79 is smaller than a coefficient of friction between the housing section 60 and the elongated member 79. According to this configuration, the housing section 60 follows the movement of the carriage 52 while moving the position of the curved portion 66. Since the elongated member 79 is in contact with the film member 76 having a smaller coefficient of friction than the coefficient of friction with respect to the housing section 60, it is possible to suppress abrasion of the elongated member 79 compared to a case where the elongated member 79 is in direct contact with the housing section 60.

(2) The recording head 53 performs recording on the medium M by ejecting liquid onto the medium M. At least one of the elongated members 79 is the tube 93 for supplying liquid to the recording head 53. According to this configuration, it is possible to suppress abrasion of the tube 93 for supplying the liquid. For example, it is possible to suppress leakage of the liquid due to abrasion of the tube 93.

(3) The recording device 11 includes one or a plurality of clamping members 80 which are attached to the elongated member 79 at intervals in the longitudinal direction LD of the elongated member 79. According to this configuration, the clamping member 80 can suppress the abrasion of the side portion of the elongated member 79 that cannot be protected by the film member 76.

(4) The housing section 60 has a plurality of link members 71, the plurality of cover members 74 and 85, and the partition plates 77 and 78. The plurality of link members 71 constitute side parts on both sides of the housing section 60, and are connected in one row in a state where adjacent link members can change an angle. The plurality of cover members 74 and 85 are engaged with both sides of at least a part of the link members 71 forming a pair on both sides among the plurality of link members 71, and in the longitudinal direction LD, the plurality of cover members 74 and 85 are arranged at intervals at a pitch of M times, the pitch of the link members 71 in the longitudinal direction, M being a natural number. The partition plates 77 and 78 are arranged at a pitch of N times, the pitch of the link members 71 in the longitudinal direction LD, N being a natural number. The plurality of clamping members 80 are attached to the elongated member 79 at a pitch shorter than the pitch P2 at which the partition plates 77 and 78 are arranged. According to this configuration, it is possible to arrange the clamping member 80 such that the elongated member 79 does not always come into contact with the partition plates 77 and 78 while the housing section 60 and the elongated member 79 are moved with the movement of the carriage 52. When the curved portion 66 moves following the movement of the carriage 52, even if the relative position between the clamping member 80 and the partition plates 77 and 78 in the longitudinal direction LD changes due to the difference in displacement between the inner circumferential side and the outer circumferential side of the moved curved portion 66, all of the clamping member 80 and the partition plates 77 and 78 can be prevented from being displaced in the longitudinal direction LD. Therefore, when the area in the housing section 60 is partitioned into a plurality of regions by the partitioning plates 77 and 78 that partition the area in the housing section 60 into a plurality of regions in the width direction, the side portion of the elongated member 79 is protected by the clamping member 80 coming into contact with the partitioning plates 77 and 78. When the area in the housing section 60 is partitioned into a plurality of regions by the partitioning plates 77 and 78 for partitioning the area in the housing section 60 in the height direction HD, the clamping member 80 comes into contact with the partitioning plates 77 and 78 via the film member 76, whereby the upper or lower portion of the elongated member 79 in the height direction HD is protected.

(5) The recording device 11 includes the first member 45 disposed below the housing section 60, and the plate member 47 disposed between the housing section 60 and the first member 45 in the height direction HD. According to this configuration, when the weight of the housing section 60 is increased and the amount of drooping is increased, the possibility that the housing section 60 comes into contact with the first member 45 located below the housing section 60 is increased. Since the drooping amount of the housing section 60 is regulated by the plate member 47, the drooping of housing section 60 can be prevented from coming into contact with the first member 45. Therefore, it is possible to suppress the occurrence of damage to the housing section 60 and the first member 45.

The above-described embodiment may be modified into the following modifications. Further, an appropriate combination of the above-described embodiment and modifications described below may be used as a further modification, and an appropriate combination of modifications described below may be used as a further modification.

Figure 11:
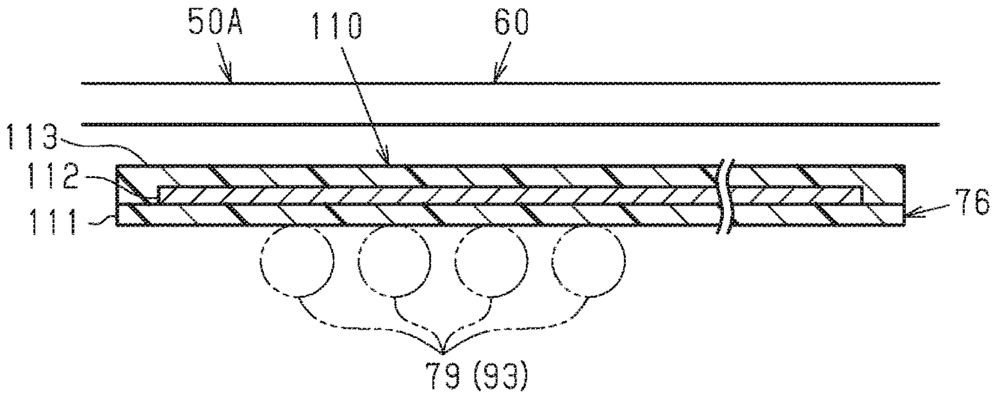
FIG. 11 is a sectional view showing an elongated member protection structure according to a modification.

As shown in FIG. 11, a noise rejection member 112 may be disposed between a film layer 111, which is an example of the film member, and the housing section 60. For example, a film member 110 may have a configuration in which the film layer 111 as an example of film member made of the same material as the film member 76 of the above-described embodiment and the noise rejection member 112 are laminated. The noise rejection member 112 is a metal sheet or a metal foil laminated in a state of being sandwiched between the film layer 111 and a surface layer 113 in the film member 110. The surface layer 113 need not necessarily be a low friction material. The film member 110 may be composed of two layers of the film layer 111 and the noise rejection member 112. Further, the present disclosure is not limited to the laminate structure, and the sheet-like noise rejection member 112 separate from the film member 76 may be disposed between the film member 76 and the housing section 60 of the above-described embodiment. According to these configurations, it is possible to enhance a shielding property for attenuating noise by the noise rejection member 112. In this case, when the signal line is located outside the housing section 60 and the power line, which is an example of a noise source, is located inside the housing section 60, it is possible to suppress the influence of noise on the signal line and the wireless region located outside. On the other hand, when the signal line is inside the housing section 60 and the power line, which is an example of a noise source, is outside the housing section 60, it is possible to suppress the influence of noise on the signal line inside the housing section 60.

Figure 12:
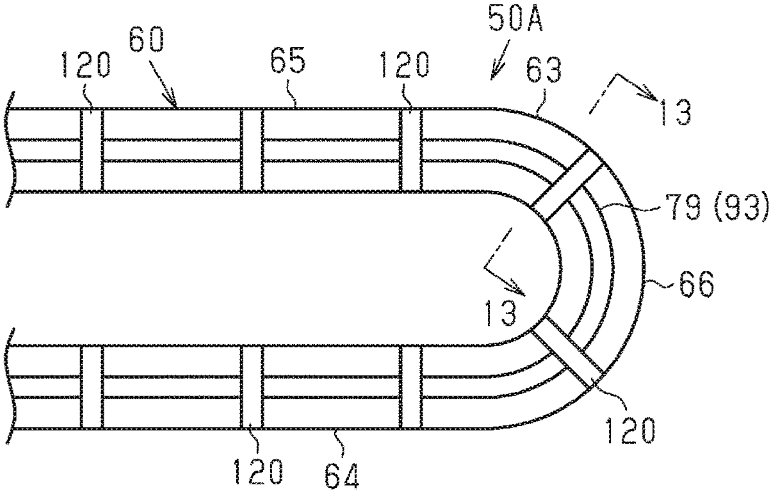
FIG. 12 is a front view showing a part of a housing section in a modification different from FIG. 11.
Figure 13:
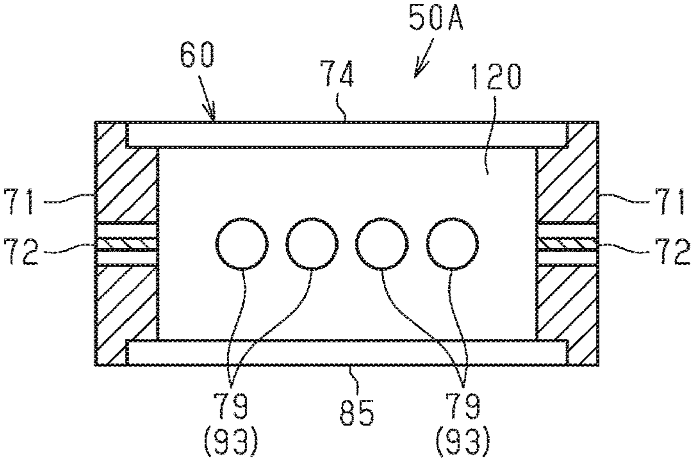
FIG. 13 is a sectional view taken along a chain line 13-13 in FIG. 12 as viewed in an arrow direction.

As shown in FIG. 12, a spacing member 120 may be arranged in the housing section 60 at predetermined intervals in the longitudinal direction LD. The spacing member 120 holds the elongated member 79, and keeps an interval between the elongated member 79 and the housing section 60 so that the held elongated member 79 and the inner wall surface of the housing section 60 do not come into contact with each other. As shown in FIG. 13, the spacing member 120 is formed of, for example, an elastic member, and has an insertion hole into which the elongated member 79 is inserted, and the elongated member 79 is held by the spacing member 120 in a state of being inserted into the insertion hole. According to this configuration, even in the curved portion 66 in which the housing section 60 is curved, the elongated member 79 is prevented from coming into contact with the inner wall surface of the housing section 60. For example, the film member 76 in the above embodiment can be eliminated.

The first member 45 may be a component or a member other than the component or the member of the air supply system. For example, the first member 45 may be a component or member of an ink supply system, a component or member of a power supply system, a component or member of a drive system, or a component or member of a cleaning system. The first member 45 may be another device or component that accumulates or generates a transmission target to be transmitted by the elongated member housed in the housing section 60. For example, the first member 45 may be a power supply component such as a power supply device or a power supply circuit. In addition, the first member 45 may be a signal generation device that generates a signal for optical communication or the like, a relay device that transmits a signal, or the like. Of course, the first member 45 may be a relay device that relays the liquid supplied from the liquid supply section 90 or the liquid container 92. Further, the first member 45 may be a waste liquid tank for storing waste liquid (for example, waste ink) from the maintenance device 55. Further, the first member 45 may be the control section 100. That is, the first member 45 may be a control box constituting the control section 100, a control circuit board constituting the control section 100, or the like.

The locking structure of the cover members 74 may be combination converse to the above-described embodiment. That is, in the locking structure, the cover members 74 side may be a locking portion such as a locking protrusion, and the link member 71 side may be a locked portion such as a locked hole.

In the embodiment, the inside of the housing section 60 is partitioned, but the elongated member 79 may be accommodated without partitioning the inside of the housing section 60.

Each of the elongated members 79 may be provided with the clamping member 80, respectively.

The film member 76 may be disposed on only one side of both sides of the housing section 60 in the height direction HD. For example, the film member 76 may be provided only on the outer circumferential side when the elongated member 79 is curved, or may be provided only on the inner circumferential side when the elongated member 79 is curved. Even in these configurations, it is possible to suppress abrasion of the portion of the elongated member 79 which slides on the film member 76.

The power line 95 or the optical cable 96 may be provided with the clamping member 80 corresponding to the diameter thereof at intervals in the longitudinal direction LD. The clamping member 80 may prevent the power line 95 or the optical cable 96 from abutting the partition plates 77, 78.

The elongated member 79 may be only the tube 93 for supplying ink. The elongated member 79 may be only the air supply tube 94. The elongated member 79 may be only the power line 95. The elongated member 79 may be only a communication cable such as the optical cable 96 or the like. Further, the elongated member 79 may be a combination of at least two or more of the ink supply tube 93, the air supply tube 94, the power line 95, and the communication cable such as the optical cable 96. For example, the elongated member 79 may be a combination of the tube 93 and the power line 95.

The elongated member 79 may not include the ink supply tube 93. For example, it may be a so-called on-carriage type in which a liquid container such as an ink cartridge is detachably mounted on the carriage 52.

The elongated member 79 may not include the air supply tube 94. For example, the maintenance device may not include a pump, and may perform cleaning for forcibly discharging liquid such as ink from the nozzles by supplying pressurized air to the recording head 53 by an air supply mechanism different from the air supply tube 94.

The medium M is not limited to a sheet, and may be a film or a medium made of a synthetic resin, a cloth, a nonwoven fabric, a laminate medium, or the like.

The recording device 11 is not limited to the inkjet type recording device 11, and may be a dot impact printer or a laser printer. Further, the recording device 11 may be a textile printing device.

Hereinafter, technical ideas grasped from the embodiment and the modification examples will be described together with effects.

(A) A recording device includes a carriage having a recording head configured to record on medium and movable in a main scanning direction, an elongated member having one end connected to the recording head or the carriage, an elongated housing section that houses the elongated member and includes a fixed end that is fixed to the apparatus side, a moving end that is fixed to the carriage, and an elongated variable section that is a variable section extending between the fixed end and the moving end, and that in which a curved portion, which is a portion where the variable section extending in parallel to the main scanning direction folds back at an intermediate section thereof, moves following movement of the carriage, and a flexible film member disposed between the elongated member and the housing section in a height direction intersecting with a longitudinal direction of the housing section, wherein a coefficient of friction between the film member and the elongated member is smaller than a coefficient of friction between the housing section and the elongated member.

According to this configuration, the housing section follows the movement of the carriage while moving the position of the curved portion. Since the elongated member is in contact with the film member having a smaller coefficient of friction than the coefficient of friction with the housing section, the elongated member can be restrained from abrasion as compared with the case where the elongated member is in direct contact with the housing section.

(B) In the above-described recording device, the recording head may perform recording on the medium by ejecting liquid onto the medium, and the elongated members may be a tube for supplying a liquid to the recording head.

According to this configuration, abrasion of the tube for supplying the liquid can be suppressed. For example, it is possible to suppress leakage of the liquid or the like due to abrasion of the tube.

(C) The above-described recording device may further include one or a plurality of clamping members attached to the elongated member at intervals in the longitudinal direction of the elongated member.

According to this configuration, the clamping member can suppress the abrasion of the side surface portion of the elongated member that cannot be protected by the film member.

(D) In the above-described recording device, the housing section has a plurality of link members that constitute both sides of the housing section and that are coupled in a line in a state in which an angle between adjacent link members is changeable, a plurality of cover members that, by being engaged on both sides by at least a part of the link members on both sides that, among the plurality of link members, form pairs, are arranged at intervals at a pitch of M times, the pitch of the link members in the longitudinal direction, M being a natural number, and partition plates arranged at a pitch of N times, the pitch of the link members in the longitudinal direction, N being a natural number, and the clamping members are attached to the elongated member at a pitch shorter than a pitch at which the partition plates are arranged.

According to this configuration, it is possible to arrange the clamping member such that the elongated member does not always come into contact with the partition wall while the housing section and the elongated member move along with the movement of the carriage. When the curved portion moves following the movement of the carriage, even if the relative position between the clamping member and the partition plate in the longitudinal direction changes due to the difference in displacement amount between the inner circumferential side and the outer circumferential side in the moved curved portion, it is possible to prevent all of the clamping member and the partition plate from being displaced in the longitudinal direction. Therefore, in a case where the inside of the housing section is partitioned into a plurality of regions by the partition plate that partitions the inside of the housing section into a plurality of regions in the width direction, the side portion of the elongated member is protected by the clamping member coming into contact with the partition plate. For example, when the interior of the housing section is partitioned into a plurality of regions by a partitioning plate that partitions the interior of the housing section in the height direction, the clamping member comes into contact with the partitioning plate through the film member, whereby the upper or lower portion of the elongated member in the height direction is protected.

(E) The above-described recording device may further include a noise reduction member disposed between the film member and the housing section in the height direction.

According to this configuration, noise can be removed. For example, in a case where the noise source is inside the housing section, the influence of the noise on the outside of the housing section can be suppressed. On the other hand, in a case where the noise source is outside the housing section, it is possible to suppress the influence of the noise on the signal line which is a kind of the elongated member in the housing section.

(F) The above-described recording device may further include a first member disposed below the housing section and a plate member disposed between the housing section and the first member in the height direction.

According to this configuration, when the weight of the housing section is increased and the amount of drooping of the housing section is increased, there is a high possibility that the housing section comes into contact with the first member located below. Since the drooping amount of the housing section is regulated by the plate member, the drooping housing section can be prevented from coming into contact with the first member. Therefore, it is possible to suppress the occurrence of damage to the housing section and the first member.

What is claimed is:

1. A recording device comprising:
- a carriage including a recording head configured to record on medium and movable in a main scanning direction;
- an elongated member having one end connected to the recording head or the carriage;
- an elongated housing section that houses the elongated member and includes
  - a fixed end that is fixed to the apparatus side,
  - a moving end that is fixed to the carriage, and
  - an elongated variable section that is a variable section extending between the fixed end and the moving end, and
  - that in which a curved portion, which is a portion where the variable section extending in parallel to the main scanning direction folds back at an intermediate section thereof, moves following movement of the carriage; and
- a flexible film member disposed between the elongated member and the housing section in a height direction intersecting with a longitudinal direction of the housing section, wherein
- a coefficient of friction between the film member and the elongated member is smaller than a coefficient of friction between the housing section and the elongated member.

2. The recording device, according to claim 1, wherein
- the recording head performs recording on the medium by ejecting liquid onto the medium, and
- the elongated member is a tube for supplying a liquid to the recording head.

3. The recording device, according to claim 2, further comprising:
- one or a plurality of clamping members attached to the elongated member at intervals in the longitudinal direction of the elongated member.

4. The recording device, according to claim 3, wherein
- the housing section includes
  - a plurality of link members that constitute both sides of the housing section and that are coupled in a line in a state in which an angle between adjacent link members is changeable,
  - a plurality of cover members that, by being engaged on both sides by at least a part of the link members on both sides that, among the plurality of link members, form pairs, are arranged at intervals at a pitch of M times, the pitch of the link members in the longitudinal direction, M being a natural number, and
  - partition plates arranged at a pitch of N times, the pitch of the link members in the longitudinal direction, N being a natural number, and
- the clamping members are attached to the elongated member at a pitch shorter than a pitch at which the partition plates are arranged.

5. The recording device, according to claim 1, further comprising:
- a noise reduction member disposed between the film member and the housing section in the height direction.

6. The recording device, according to claim 1, further comprising:
- a first member disposed below the housing section and
- a plate member disposed between the housing section and the first member in the height direction.

* * * * *